United States Patent [19]

Wakabayashi

[11] Patent Number: 5,598,332
[45] Date of Patent: Jan. 28, 1997

[54] CASH REGISTER CAPABLE OF TEMPORARY-CLOSING OPERATION

[75] Inventor: Kenichi Wakabayashi, Yamato-Koriyama, Japan

[73] Assignee: Sharp Kabushiki Kaisha, Osaka, Japan

[21] Appl. No.: 870,780

[22] Filed: Apr. 16, 1992

[30] Foreign Application Priority Data

Apr. 17, 1991 [JP] Japan .................................. 3-085514

[51] Int. Cl.⁶ ................................................. G06F 17/60
[52] U.S. Cl. ........................................................ 395/224
[58] Field of Search ......................... 364/405; 235/7 R, 235/8, 6, 11, 383, 380

[56] References Cited

U.S. PATENT DOCUMENTS

| | | |
|---|---|---|
| 4,068,213 | 1/1978 | Nakamura et al. . |
| 4,493,037 | 1/1985 | Takano et al. ........................... 364/405 |
| 4,752,875 | 6/1988 | Takebayashi ........................... 364/405 |

FOREIGN PATENT DOCUMENTS

| | | |
|---|---|---|
| 0400653A2 | 12/1990 | European Pat. Off. . |
| 58-31469 | 2/1983 | Japan . |
| 63-138496 | 6/1988 | Japan . |
| 1-169596 | 7/1989 | Japan . |
| 2-113397 | 4/1990 | Japan . |

OTHER PUBLICATIONS

T1-5128 Guidebook, 1991, pp. 1-37.
Patent Abstracts of Japan, vol. 007, No. 057 (p 181). Mar. 9, 1983.
Patent Abstracts of Japan, vol. 006, No. 233, p 156, Nov. 19, 1982.

*Primary Examiner*—Robert A. Weinhardt
*Attorney, Agent, or Firm*—David G. Conlin; George W. Neuner

[57] ABSTRACT

A cash register which is capable of executing a temporary-closing process without terminating a transaction, includes a closing key (15) for inputting an end-indication of a registering process of transaction data, and a temporary-closing key (12) to initiate collecting registered contents prior to ending the registering process. The temporary-closing key (12) initiates executing a temporary-closing operation in accordance with a result of the accumulation. Further, the temporary-closing key (12) initiates collecting contents of payments after a periodic payment is paid in case that the periodic payment is made after a registering process is performed by an occurrence of a partial payment with the one transaction.

8 Claims, 6 Drawing Sheets

CASH REGISTER CAPABLE OF TEMPORARY-CLOSING OPERATION

BACKGROUND OF THE INVENTION

1. Field of the Invention

The present invention relates to a cash register, more particularly, a cash register which is capable of performing a temporary-closing operation while keeping a transaction open.

2. Background of the Invention

Figure 1:
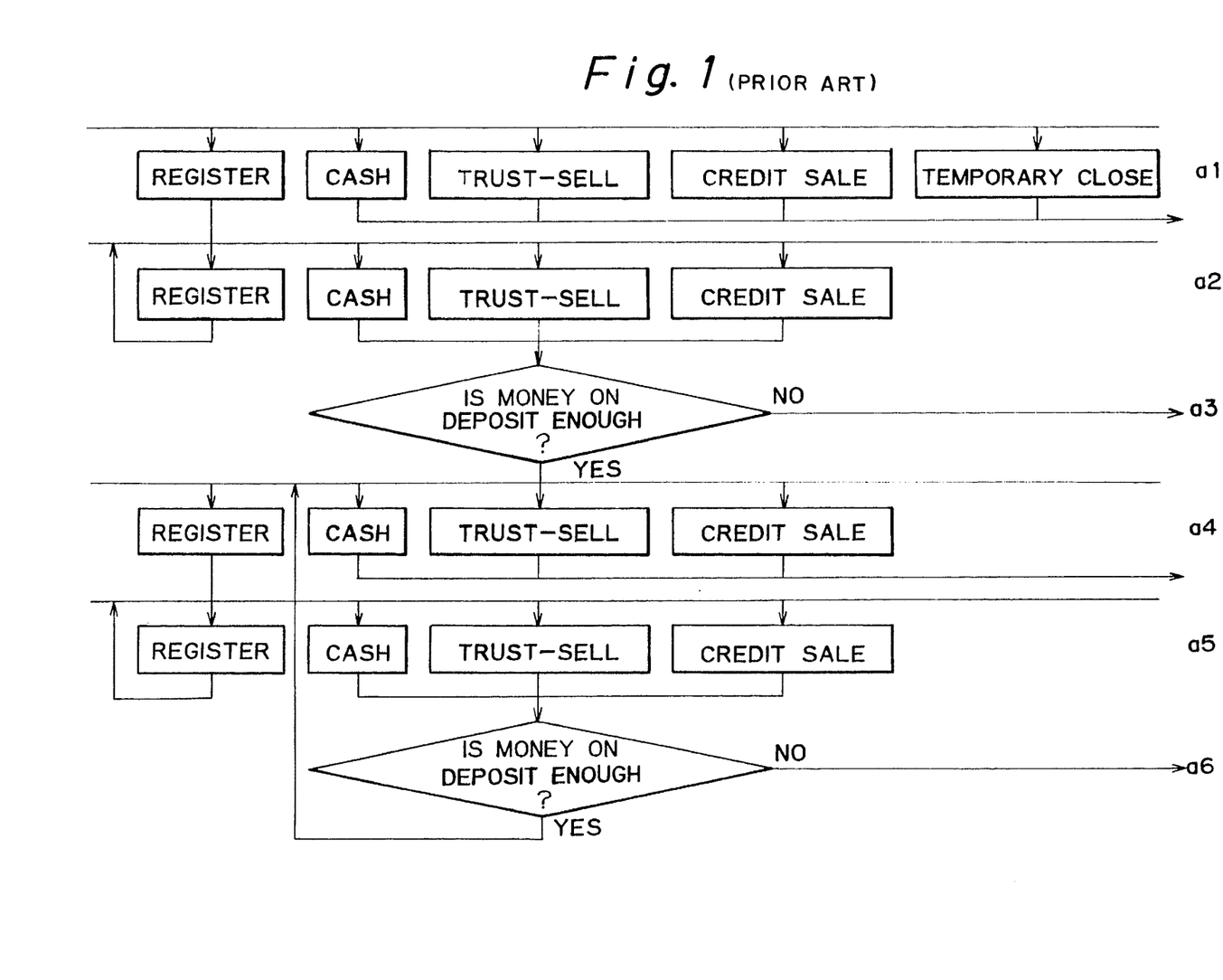
FIG. 1 is a flow chart showing a key-operating routine on a known electronic cash register.

The inventors of the present invention know of an electronic cash register which is arranged to have a key operation process as shown in the flow chart of FIG. 1. (Prior Art)

Referring to FIG. 1, the key operation of the above-mentioned electronic cash register will be described in detail.

At step a1, a user (operator) presses any one of the registering key, the cash key, the trust-selling key, the credit-sale key, and the temporary-closing key. In the case that the price of the goods sold is paid once, at steps a1 and a2, the user selectively presses the registering key, the cash key, the trust-selling key, the credit-sale key and the temporary-closing key for inputting a kind of payment such as a cash payment, a trust-selling payment or a credit-sale payment, the grouping departments of the goods sold and the amount of payment.

In succession to the operation of the registering key, any one of the cash key, the trust-selling key, the credit-sale key and the temporary-closing key may be selectively pressed. If at step a2, any one of the above-mentioned keys except the registering key is pressed, at step a3, it is determined whether or not the amount of payment done by negotiable securities such as commodity securities and a credit card reaches the total price of the sold goods. If yes, the transaction is terminated and a receipt is issued.

If no at step a3, on the other hand, it is possible to temporarily close the transaction and issue the receipt as the transaction is left open. In this case, the temporary-closing key is pressed at step a1. With this operation, the sum of the contents of payments and the issuance of the receipt based on the sum are carried out as a temporary-closing process. The temporary-closing process does not require the pressing of the cash key but requires the pressing of another key for terminating of the transaction.

If yes at step a3 and the registering process is on the way, the process goes to step a4 for doing the later registering process. At step a4, any one of the above-mentioned keys may be selectively pressed. With some key being pressed, the registering operation is over and the receipt is issued. At step a4, if the amount of payment is not enough to reach the total price at step a3, the operation of the temporary-closing key is prohibited as described below.

That is, when the process reaches step a4 through step a3, all keys except the registering keys are operable if the amount of payment is equal to the price or nothing is paid. If the registering key is pressed at step a4, then at step a5, any one of the above-mentioned keys may be selectively pressed. With some key being pressed, the process goes to step a6 at which it is determined whether or not the amount of payment is enough to reach the exact price. If yes, the total price of the sold goods is paid at steps a4 and a5, the registering operation is terminated and a receipt is issued. If yes at step a6, the process goes to step a4 at which the foregoing process is repeated.

In a case where part of the price is paid as earnest money at steps a1, a2 and/or a3, the earnest money is input by pressing the registering key at steps a1 and/or a2. This means that the shortage of earnest money takes place at step a3. In this state, the temporary-closing key is disallowable to be pressed at subsequent steps a4 and a5. If part of the total sum is paid as earnest money and the remaining cash is paid later, the temporary-closing process is carried out when the remaining cash is paid. Thus, no receipt cannot be issued.

Figure 2:
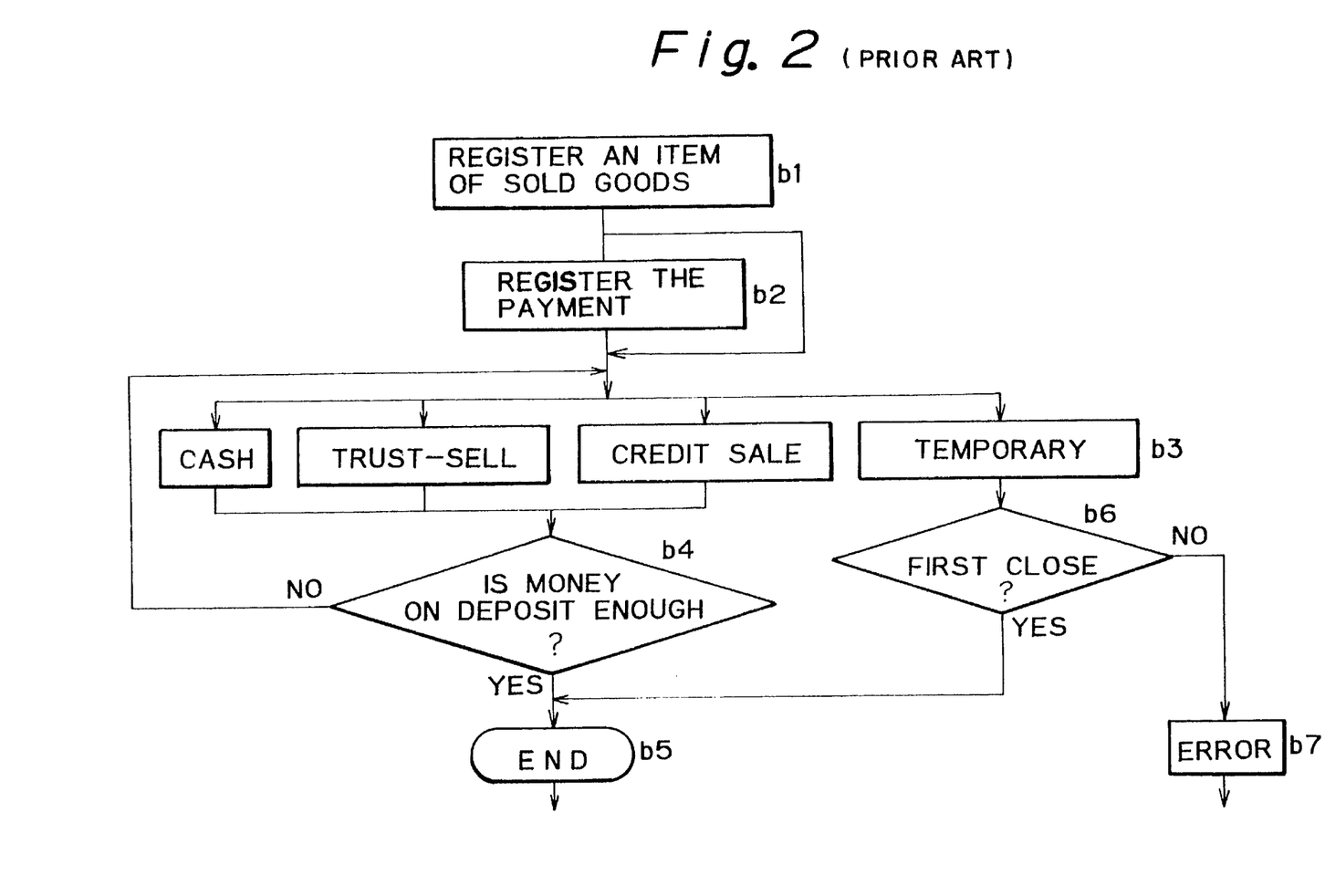
FIG. 2 is a flow chart showing an operation of the known electronic cash register.

FIG. 2 is a flow chart showing the registering operation of the above-mentioned cash register.

At step b1, department codes (items) for the sold goods, for example, are registered. At step b2, the payment is given for the goods and the amount of money is registered by pressing the registering key. After step b3, the temporary-closing process is proceeded. At step b3, any one of the cash key, the trust-selling key, the credit-sale key and/or the temporary-closing key may be selectively pressed.

With any one of the above-mentioned keys being selected, the process goes to step b4 at which it is determined whether or not the amount of payment is enough to reach the total price for the sold goods. If not, the process goes to step b3 at which the foregoing process is repeated. If yes at step b4, the process goes to step b5 at which the payment for the sold goods is over and the process is terminated.

If the temporary-closing key is selected at step b3, the process goes to step b6 at which it is determined whether or not the amount of payment has been already enough to reach the total price of the sold goods before pressing the temporary-closing key. If yes at step b6, the process goes to step b5 at which the registered contents are gathered and the receipt is issued. Then, the process is terminated. If no at step b6, the process goes to step b7 at which an alarm, such as a beep, is issued.

As described above, the above-mentioned cash register is arranged so that the user cannot handle the temporary-closing key after a part of the total sum is paid for example, as earnest money. This means that if a customer buying goods, pays for only part of the price of the goods sold as earnest money and pays for the remaining price later, the temporary-closing operation is disallowed. Hence, the above-mentioned cash register has a low usability.

The above-mentioned cash register is so arranged that when a customer pays for the price of the sold goods there exist two choices: the payment for the sold goods may be given in full or no payment is done. Hence, it is difficult to use the cash register at all times, when the user needs to use it.

To overcome the foregoing two shortcomings, for example, it is possible to employ a method whereby a credit card may be inserted into the cash register and the "trust-selling" process is carried out by pressing the "trust-selling" key. In such a case, a new shortcoming takes place wherein the total amount of the money stored by the cash register itself (i.e., in memory) is not equal to the amount of money actually placed in a drawer of the cash register.

As described above, the above-mentioned cash register is not able to perform the process of accepting earnest money corresponding to a part of the price of the goods sold, due to the temporary-closing process when the remaining money is paid later, and issue the receipt. The disability means that the cash register has a low usability.

SUMMARY OF THE INVENTION

It is therefore an object of the present invention to provide a cash register which is capable of overcoming the foregoing technical shortcomings for improving usability of such cash registers.

The object of the present invention can be achieved by a cash register which is capable of executing a temporary-closing process without terminating the transaction. Thus, the cash register of the present invention includes a unit for inputting an end-indication of a registering process concerning transaction data, a unit for collecting registered contents preceding an end of the registering process, the collecting unit being capable of signaling for executing a temporary-closing operation in accordance with a result of the accumulation.

Preferably, the collecting unit is capable of collecting contents of payments after a further partial payment is paid in the case where the further partial payment is performed after a registering process is performed by an occurrence of a payment concerning the one transaction so that the entire amount of partial payments that have been made can be added together.

More preferably, the collecting unit is capable of executing the issue of a receipt in accordance with the result of the accumulation.

The cash register further includes a unit for storing a program which is used for executing the transaction process, preferably, in accordance with the collecting unit.

The cash register further includes a unit for temporarily storing data to be processed, preferably, in accordance with the inputting unit.

The cash register further includes a unit for controlling both the storing unit and the temporarily storing unit in accordance with the inputting unit and the collecting unit.

The cash register further preferably includes a unit for displaying data of the transaction process.

Preferably, the inputting unit for indicating the end of the registering process is a closing key, and the collecting unit for signaling execution of the temporary-closing process is a temporary-closing key.

The cash register preferably further includes a keyboard which includes both the closing key and the temporary-closing key.

The keyboard preferably further includes a cash key for indicating the transaction is performed on a basis of a cash.

The keyboard further preferably includes a trust-selling key for indicating the transaction is performed on a basis of a trust-selling.

The keyboard further preferably includes a credit-sale key for indicating the transaction is performed on a basis of a credit-sale.

The storing unit is preferably a read-only memory.

The temporarily storing unit is preferably a random access memory.

The controlling unit is preferably a control processing unit.

In operation, the cash register operates to input an indication of terminating a registering operation by using a closing key when the payment covers the total price needed for one transaction at one time. When the transaction is not terminated, the registered contents of the first to the current stages are gathered by using the temporary-closing key and the receipt is issued. The receipt describes the gathered contents. If the amount of total payments match the total price of the goods sold, the temporary-closing process is terminated through another process. On the other hand, if part of the price of the goods sold is paid as an earnest money, the transaction is not terminated. Later, when the remaining money is paid, because the transaction is kept continued by pressing the temporary-closing key so that the registering process for the transaction is terminated without having to otherwise terminate the transaction, then, the registered contents of the first to the current stages are gathered and the receipt is issued. The receipt describes the gathered contents.

As set forth above, the temporary-closing key may be handled when the transaction is not terminated, for example, when part of the price of the good sold is paid. Hence, as the transaction is kept continued, the registering process may be terminated and the registered contents of the first to the current stages are gathered. Then, the relevant receipt is issued. That is, even in a case that the amount of payment does not reach the total price of the goods sold, the receipt is allowed to be issued by doing the temporary-closing process. This results in remarkably improving the usability of the electronic cash register.

Further objects and advantages of the present invention will be apparent from the following description of the preferred embodiment of the invention as illustrated in the accompanying drawings.

DESCRIPTION OF THE PREFERRED EMBODIMENT

Referring to the accompanying drawings, an embodiment of a cash register according to the present invention will be described in detail.

Figure 3:
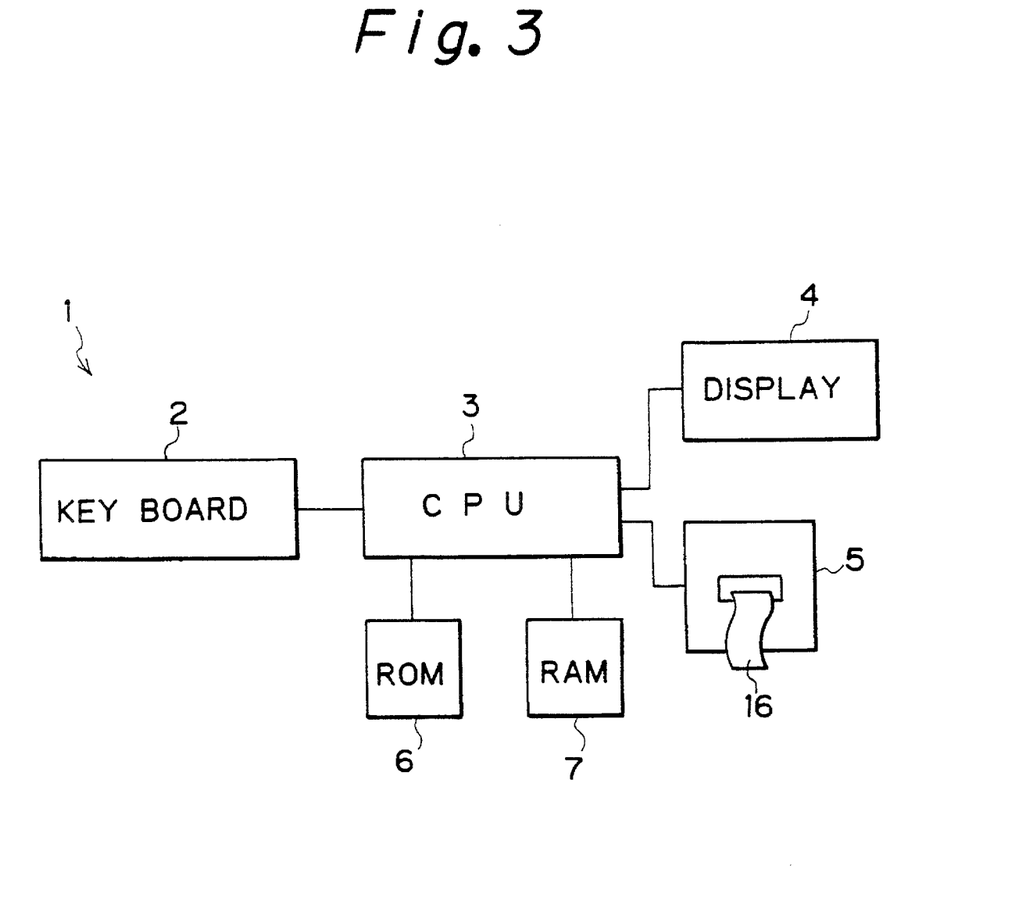
FIG. 3 is a block diagram showing an arrangement of an embodiment of a cash register according to the present invention.

FIG. 3 is a block diagram showing an arrangement of a cash register according to an embodiment of the present invention.

As shown in FIG. 3, the cash register 1 includes a keyboard 2, a central processing unit (CPU) 3, a read-only memory (ROM) 6, a random access memory (RAM) 7, a display 4, and a printer 5.

The CPU 3 is connected to each of the other components so that the CPU 3 may control the other components.

The keyboard 2 functions as an input means and the printer 5 functions as an output means.

The ROM 6 stores a program under which the cash register 1 is controlled.

The RAM 7 temporarily stores the data about the titles and the prices of items of goods on sale, which are handled in the CPU 3.

A receipt 16 is printed out from the cash register 1 with a handled data thereon.

Figure 4:
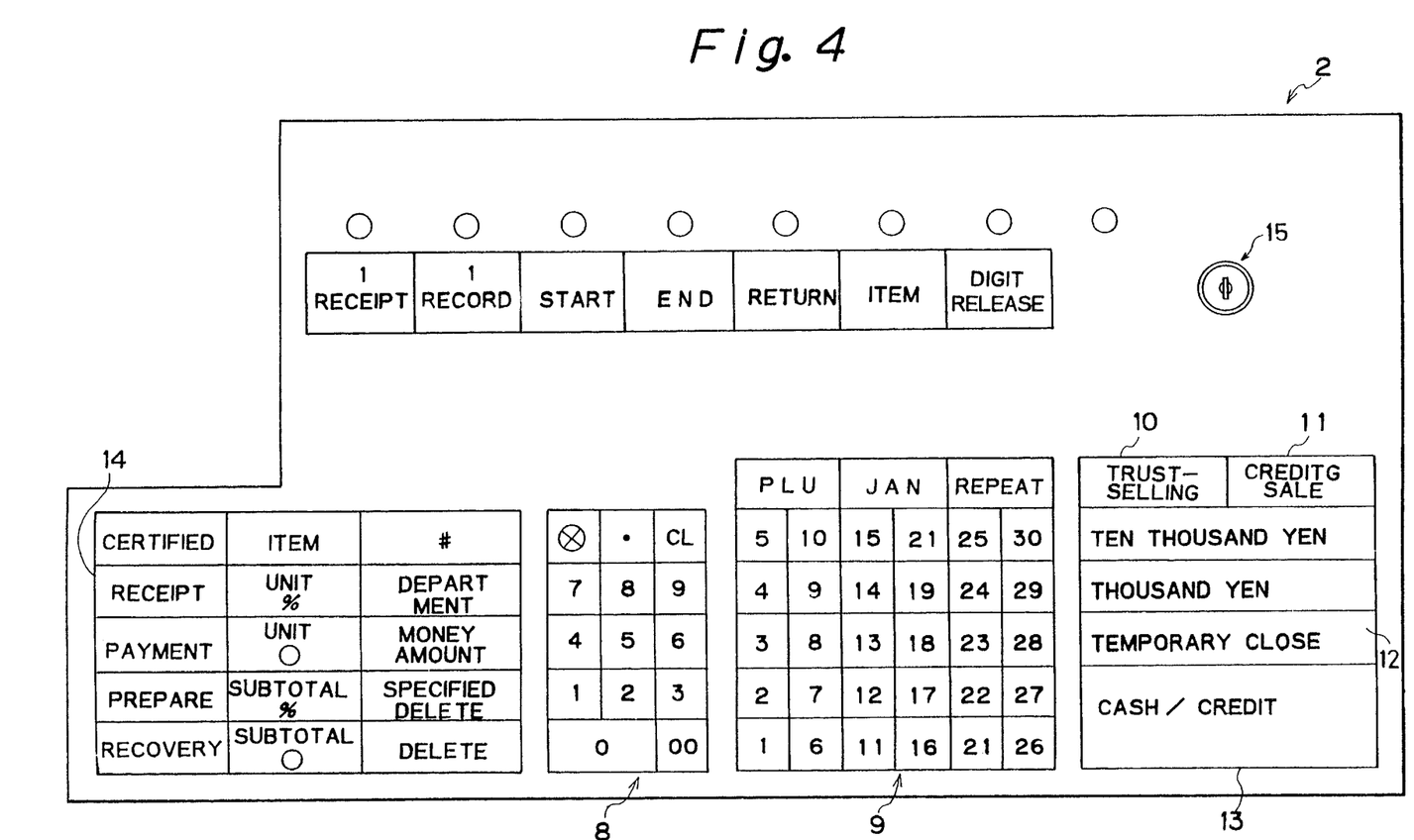
FIG. 4 is a plane view showing a key arrangement of a key inputting section in the cash register shown in FIG. 3.

FIG. 4 illustrates an arrangement of the keyboard 2.

As shown in FIG. 4, the keyboard 2 includes a registering key group 8 by which the prices of goods sold are input, a department key group 9 by which input are the numerical value codes for the predetermined departments of the goods to be handled, and the various functional keys.

Those various functional keys include a trust-selling key 10, a credit-sale key 11, a temporary-closing key 12, a cash key 13, and a receipt key 14. 15 denotes a function switch.

A special key held by a user of the register 1 is inserted to the function switch 15 and is turned so that the operational state of the cash register 1 is switched from a stopping state to a registering state and further to a checking state.

Figure 5:
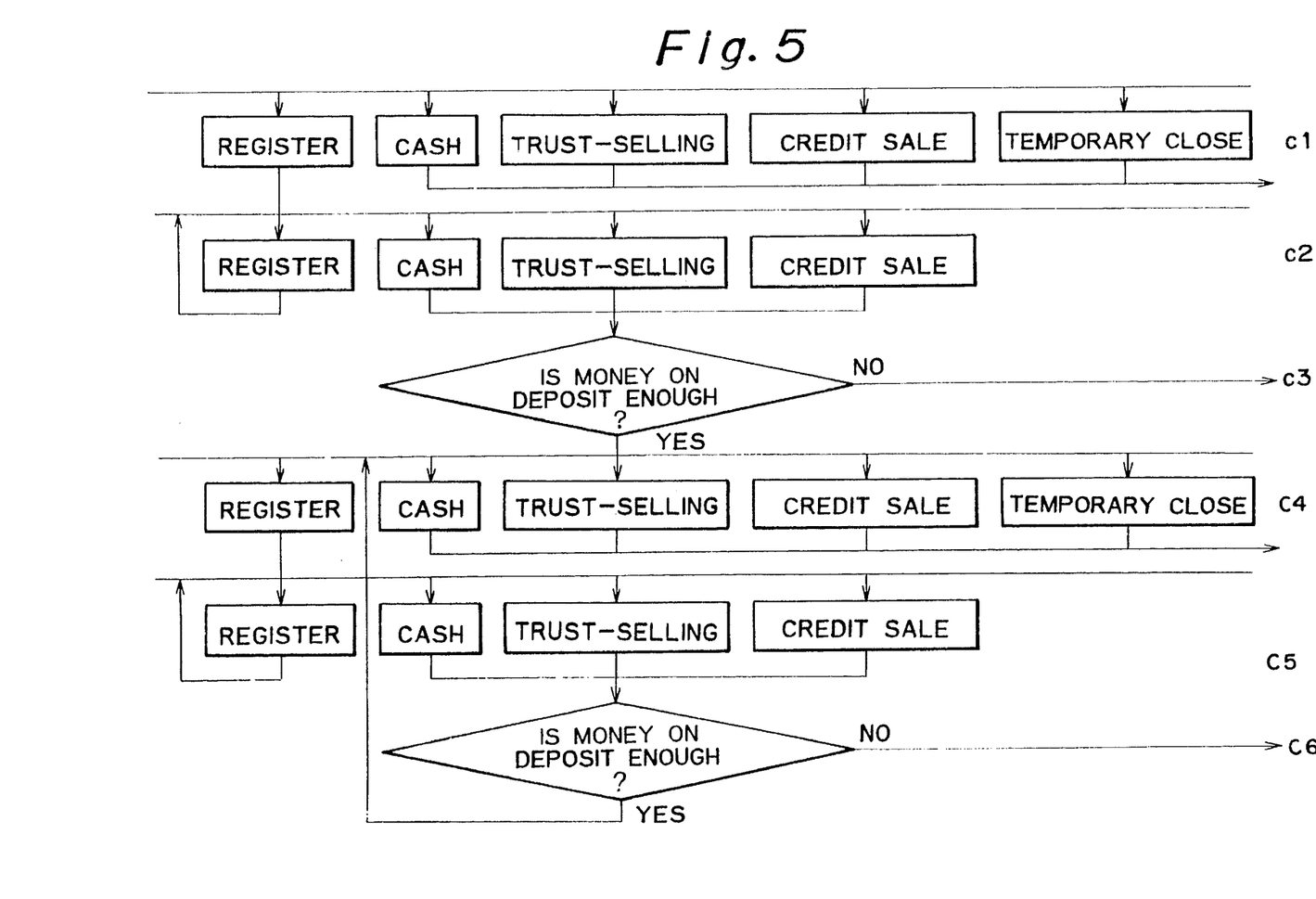
FIG. 5 is a flow chart showing a key-operating routine of the cash register of FIG. 3.

FIG. 5 is a flow chart for describing a key-handling routine performed by the cash register of FIG. 1 according to this embodiment.

Figure 6:
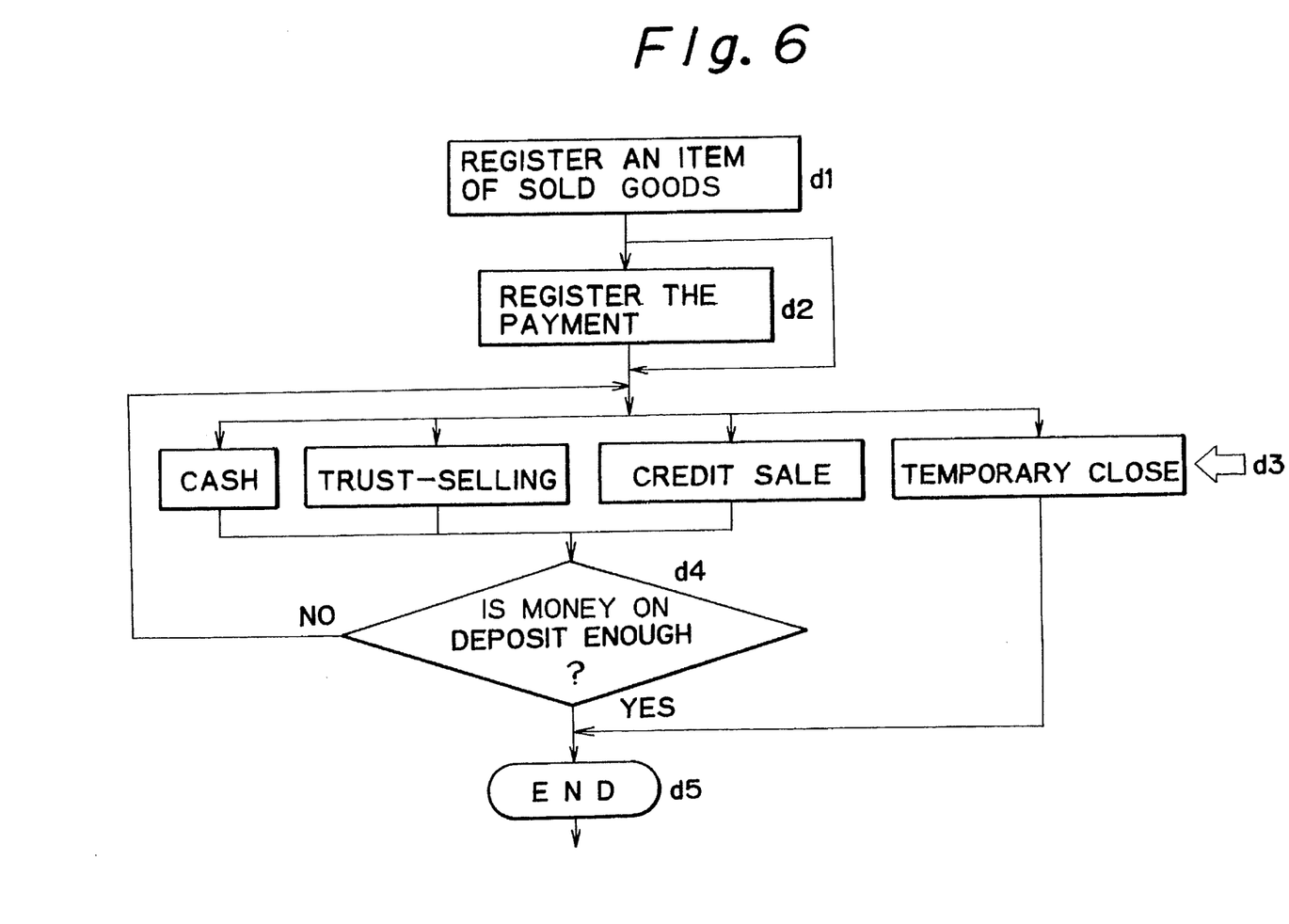
FIG. 6 is a flow chart showing an operation of the cash register of FIG. 3.

FIG. 6 is a flow chart for describing the contents to be processed in this embodiment.

In FIG. 5, at step c1, a user handles any one of the following keys, the registering key 8, the cash key 13, the trust-selling key 10, the credit-selling key 11, and/or the temporary-closing key 12.

In case that the payment for the goods sold is given at one time, the user handles the appropriate key, i.e., the registering key 8, the cash key 13, the trust-selling key 10 the credit-sale key 11, and/or the temporary-closing key 12. Then, the input is the data about the cash payment, the kind of the payment such as the trust-selling or the credit-sale, a classification group or department for the sold good, or an amount of payment.

In succession to the handling of the registering key 8, any one of the cash key 13, the trust-selling key 10, the credit-cash key 11 and the temporary-closing key 12 may be selected. In case that any one of the remaining keys 10, 11, 13 except the registering key 8 is handled at step c2, the process goes to step c3 at which the payment is done by cash, negotiable securities such as commodity securities or a credit card, and is equal to the total price of the goods sold.

In case the price is paid exactly, the transaction is terminated and the receipt 16 (see FIG. 3) is issued.

In case the customer did not exactly pay for the goods sold, the process of terminating the registering process and issuing the receipt 16 as keeping the transaction continued may be carried out as a temporary-closing process.

In this case, the temporary-closing key 12 is pressed at step c1. With this key being pressed, the paying contents of the first to the current stages are gathered and the temporary-closing process is carried out so that the receipt 16 based on the gathered result may be issued. The temporary-closing process does not require the pressing of the cash key 13 but another means for terminating the transaction.

In case that it is "yes" at step c3 and the registering process is on the way, the process goes to step c4 at which any one of the keys 8, 10, 11 and 13 may be selectively handled. With the keys 10, 11 and 13 being handled, the registering operation is terminated and the receipt is issued. In this embodiment, at step c4, even if the amount of payment does not reach the exact price of the sold good at step c3, the temporary-closing key 16 is allowed to be handled.

In case that the registering key 8 is handled at step c4, any one of the keys 8, 10, 11 and 13 maybe selectively handled at step c5. By handling the keys 10, 11 and 13, the process goes to step c6 at which it is determined whether or not the amount of payment reaches the exact price of the goods sold. In case that it is "yes" at step c6, it is determined that the payment reaches the total price of the goods sold. Then, the registering operation is terminated and the receipt is issued. In case that it is "no" at step c6, the process goes to step c4 at which the foregoing process is repeated.

When the customer partially pays for the goods as with earnest money at steps c1, c2 and c3, the registering key 8 is handled at the steps c1 and c2. At step c3, it is determined that the amount of payment does not reach the necessary price. In such a state, the temporary-closing key 12 is allowed to be handled at the later steps c4 and c5. That is, in case that the customer partially pays for the goods as with earnest money and pays the remaining money later, the temporary-closing process is carried out when the remaining money is paid and the receipt is issued.

FIG. 6 is a flow chart for describing the registering operation of the cash register 1.

At step d1, the department codes (item) of sold goods are registered. At step d2, the price of the goods is paid and the necessary amount of money is registered by using the registering key(s) 8. At step d3 or later, the closing process is carried out. At step d3, any one of the cash register 13, the trust-selling key 10, the credit-sale key 11 and the temporary-closing key 12 may be selected.

With the keys 13, 10 or 11 being selected, the process goes to step d4 at which it is determined whether or not the amount of payment reaches the exact price of the goods sold. In case that it is "no", the process goes to step d3 at which the foregoing process is repeated. In case that it is "yes" at step d4, the process goes to step d5 at which the payment of the price of the sold good is terminated. Then, the receipt 16 is issued and the process is terminated.

When the temporary-closing key 12 is selected at step d3, the process directly goes to step d5 at which the foregoing process is terminated.

As set forth above, according to the present embodiment, the content of the transaction is allowed to be processed at a time when the total price of the sold goods in one transaction is paid by cash or negotiable securities such as commodity securities, or no payment is done or a part of the total price of the goods sold is paid as earnest money and the remaining money is paid later. That is, even if the earnest money is paid, and the paid money does not reach the sum of the prices of the goods sold, the registering process is temporarily carried out. This process results in gathering the registered contents until the remaining money is input and issuing the receipt describing the data about the earnest money, the remaining money and the total necessary money. Hence, the cash register according to this embodiment is capable of handling the transaction in which the earnest money is paid beforehand and the remaining money is paid later, resulting in being able to remarkably improve the usability of the cash register 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A cash register having a temporary-closing function for closing a first transaction temporarily in order to register data of another transaction, when a paid amount is less than a total amount of said first transaction, said cash register comprising:

an input means for inputting data of said first transaction including a unit price and a quantity, and a payment with its payment kind;

a calculating means for calculating said total amount based on said data inputted by said input means;

a determining means for determining whether said payment inputted by said input means is less than said total amount calculated by said calculating means;

a temporary-closing means for performing a temporary closing of said first transaction of said total amount, by registering said payment and said total amount, and by issuing a receipt describing said payment, said total amount and a remainder of said total amount when said determining means determines that said payment is less than said total amount;

wherein said temporary-closing means gathers the total payments that have been made and registers a payment of a part of said remainder, when said part of said remainder is paid after closing by said temporary-closing means; and a closing means for final closing of said total amount of said first transaction by registering payment data of said remainder and it is determined that the total payments match the total amount of said first transaction, when said remainder is paid after said temporary closing by said temporary-closing means.

2. A cash register according to claim 1, wherein said closing means includes a storing means for storing said payment data of said remainder.

3. A cash register according to claim 2, wherein said temporary-closing means includes a temporary storing means for storing data described on said receipt.

4. A cash register according to claim 3, wherein said cash register further comprises means for controlling both said storing means and said temporarily storing means in order to send data in said temporary storing means to said storing means.

5. A cash register according to claim 4, wherein said cash register further comprises means for displaying said data described on said receipt and said payment data of said remainder.

6. A cash register according to claim 2, wherein said storing means comprises a read-only memory.

7. A cash register according to claim 3, wherein said temporarily storing means comprises a random access memory.

8. A cash register according to claim 4, wherein said controlling means comprises a control processing unit.

* * * * *